United States Patent
Wakayama et al.

(10) Patent No.: US 8,608,619 B2
(45) Date of Patent: Dec. 17, 2013

(54) AUTOMATIC TRANSMISSION AND CONTROL METHOD THEREFOR

(75) Inventors: Hideshi Wakayama, Hadano (JP); Keichi Tatewaki, Atsugi (JP); Seiichiro Takahashi, Isehara (JP); Yuzuru Tohta, Sagamihara (JP); Takashi Matsuda, Isehara (JP); Daisuke Matsumoto, Sagamihara (JP)

(73) Assignees: Jatco Ltd, Fuji-shi (JP); Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/576,546

(22) PCT Filed: Jan. 14, 2011

(86) PCT No.: PCT/JP2011/050522
§ 371 (c)(1),
(2), (4) Date: Aug. 1, 2012

(87) PCT Pub. No.: WO2011/111415
PCT Pub. Date: Sep. 15, 2011

(65) Prior Publication Data
US 2012/0302400 A1    Nov. 29, 2012

(30) Foreign Application Priority Data

Mar. 9, 2010  (JP) ................................ 2010-052376

(51) Int. Cl.
*F16H 59/00*    (2006.01)

(52) U.S. Cl.
USPC .......................................................... 477/98

(58) Field of Classification Search
USPC ...................................................... 477/901.98
See application file for complete search history.

(56) References Cited

U.S. PATENT DOCUMENTS

| | | | |
|---|---|---|---|
| 5,820,515 A * | 10/1998 | Fukaya et al. ................... | 477/92 |
| 6,913,558 B2 * | 7/2005 | Mori et al. ........................ | 477/3 |
| 8,167,773 B2 * | 5/2012 | Kothari et al. ................... | 477/98 |
| 8,174,222 B2 * | 5/2012 | Patel et al. ............... | 318/400.32 |
| 8,321,101 B2 * | 11/2012 | Thomas et al. .................. | 701/54 |
| 8,340,860 B2 * | 12/2012 | Kobayashi et al. .......... | 701/30.8 |
| 2012/0083977 A1 * | 4/2012 | Tanaka et al. ................... | 701/55 |
| 2012/0298462 A1 * | 11/2012 | Wakayama et al. ...... | 192/48.601 |
| 2012/0302402 A1 * | 11/2012 | Waku et al. .................... | 477/175 |

FOREIGN PATENT DOCUMENTS

| | | | |
|---|---|---|---|
| JP | 2000-104587 A | 4/2000 |
| JP | 2002-047962 A | 2/2002 |
| JP | 2006-153091 A | 6/2006 |
| JP | 2010-230132 A | 10/2010 |

* cited by examiner

*Primary Examiner* — Dirk Wright
(74) *Attorney, Agent, or Firm* — Foley & Lardner LLP (57) ABSTRACT

When the temperature of oil supplied to an electrical oil pump is detected and the oil temperature is lower or higher than normal oil temperature, a gradient threshold value smaller than that at normal oil temperature is set, a gradient of a road surface on which a vehicle is stopped is detected, and an idle stop is prohibited when the detected gradient of the road surface is larger than the set gradient threshold value.

2 Claims, 6 Drawing Sheets

AUTOMATIC TRANSMISSION AND CONTROL METHOD THEREFOR

TECHNICAL FIELD

The present invention relates to an automatic transmission and a control method therefor.

BACKGROUND ART

A conventional automatic transmission is known which includes a mechanical oil pump and an electrical oil pump and in which a hydraulic pressure is supplied from the electrical oil pump to a gear corresponding to a starting shift position during an idle stop control.

However, if a gradient of a road surface on which a vehicle is stopped is large, the inclination of an oil surface in an oil pan is large and a suction port of an oil strainer comes out of oil, whereby air is sucked into the electrical oil pump together with oil. If air is introduced into the electrical oil pump, a hydraulic pressure may not be sufficiently supplied from the electrical oil pump to the gear corresponding to a start position. If the vehicle is stopped on an uphill road surface in a traveling direction and an idle stop control is executed in such a case, it takes a long time until the gear is engaged and the vehicle may move backward during a time until the gear is engaged when a return is made from the idle stop control.

Contrary to this, in JP2002-47962A, the idle stop control is prohibited when a gradient of a road surface on which a vehicle is stopped is large, whereas the idle stop control is executed when the gradient of the road surface is small.

Since this prevents the idle stop control from being executed when the road surface has a large upward gradient in the traveling direction, it is possible to suppress a backward movement of the vehicle at startup and execute the idle stop control to improve fuel economy when the gradient of the road surface is small.

SUMMARY OF INVENTION

If oil temperature is low, the diameters of seal rings used, for example, in frictional engagement elements are reduced and the amount of oil leakage increases. Further, if oil temperature is high, the viscosity of oil is reduced and the amount of oil leakage increases. Thus, even if the vehicle is stopped on road surfaces having the same inclination, a hydraulic pressure may not be supplied to the gear corresponding to the starting shift position depending on the oil temperature of the oil.

However, in the above invention, the oil temperature is not taken into consideration. Thus, in the above invention, the idle stop control may be executed even if the oil temperature is low or high, the amount of oil leakage is large and the hydraulic pressure cannot be sufficiently supplied to the gear corresponding to the start position. This leads to a problem that the vehicle moves backward when a return is made from the idle stop control.

The present invention was developed to solve such a problem and aims to suppress a backward movement of a vehicle and improve vehicle startability when the vehicle is started again after being stopped on an uphill road surface in a traveling direction.

One aspect of the present invention is directed to an automatic transmission to be combined with an engine which performs an idle stop, including an electrical oil pump which is driven while the engine is automatically stopped; oil temperature detection means for detecting oil temperature of oil supplied to the electrical oil pump; gradient threshold value setting means for setting a gradient threshold value based on the oil temperature; gradient detection means for detecting a gradient of a road surface on which a vehicle is stopped; and idle stop prohibition means for prohibiting the idle stop when the gradient is larger than the gradient threshold value. The gradient threshold value setting means sets a gradient threshold value smaller than that at normal oil temperature when the oil temperature is lower or higher than the normal oil temperature.

Another aspect of the present invention is directed to a control method for an automatic transmission to be combined with an engine which performs an idle stop, comprising the steps of detecting oil temperature of oil supplied to an electrical oil pump; setting a gradient threshold value smaller than that at normal oil temperature when the oil temperature is lower or higher than the normal oil temperature; detecting a gradient of a road surface on which a vehicle is stopped; and prohibiting the idle stop when the gradient is larger than the set gradient threshold value.

According to these aspects, for example, when the oil temperature is low and the amount of oil leakage increases due to a reduction in the diameters of seal rings used in frictional engagement elements and the like, permission conditions for an idle stop control are tightened by decreasing the gradient threshold value. This can suppress a backward movement of the vehicle when the vehicle is started again after being stopped on an uphill road surface in a traveling direction of the vehicle.

For example, when the oil temperature is high and the amount of oil leakage increases due to a reduction in the viscosity of the oil, the permission conditions for the idle stop control are tightened by decreasing the gradient threshold value. This can suppress a backward movement of the vehicle when the vehicle is started again after being stopped on an uphill road surface in the traveling direction of the vehicle.

According to these aspects, vehicle startability can be improved.

An embodiment of the present invention and advantages thereof are described in detail below with reference to the accompanying drawings.

EMBODIMENT OF INVENTION

In the following description, a "speed ratio" of a certain transmission mechanism is a value obtained by dividing an input rotation speed of this transmission mechanism by an output rotation speed thereof. Further, a "lowest speed ratio" means a maximum speed ratio of this transmission mechanism and a "highest speed ratio" means a minimum speed ratio thereof. In this embodiment, a gradient indicates an upward gradient in a traveling direction of a vehicle.

Figure 1:
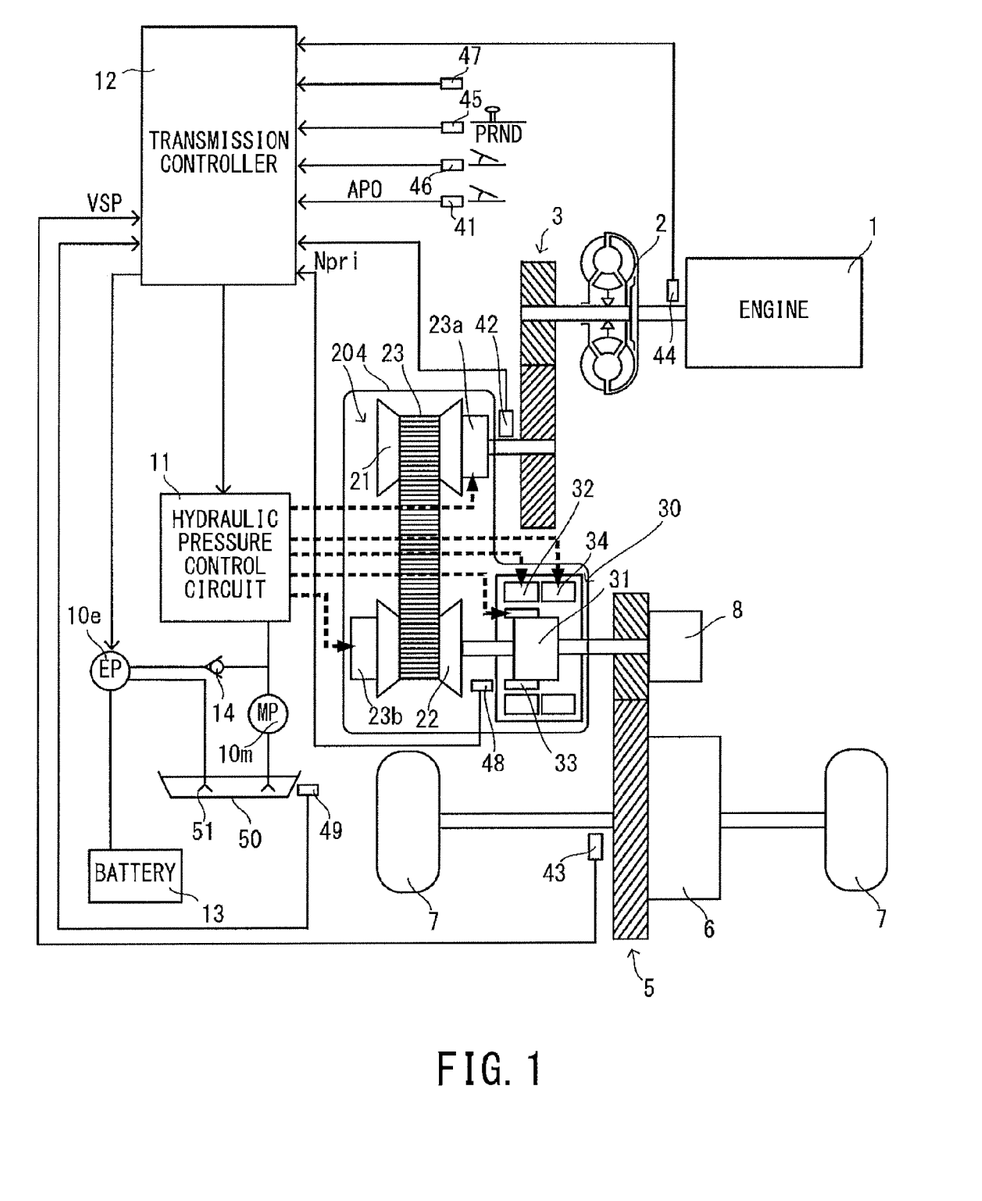
FIG. 1 is a schematic configuration diagram of a vehicle equipped with an idle stop control device in an embodiment of the present invention.

FIG. 1 is a schematic configuration diagram of a vehicle equipped with a control device for transmission according to the embodiment of the present invention. This vehicle includes an engine 1 as a drive source. Output rotation of the engine 1 is transmitted to drive wheels 7 via a torque converter 2 with a lock-up clutch, a first gear train 3, a continuously variable transmission (hereinafter, merely referred to as a "transmission 4"), a second gear train 5 and a final speed reducer 6. The second gear train 5 includes a parking mechanism 8 for mechanically locking an output shaft of the transmission 4 in a parked state so as not to be able to rotate.

The vehicle includes a mechanical oil pump 10m which is driven using a part of power of the engine 1, an electrical oil pump 10e which is driven by an electric motor, a hydraulic pressure control circuit 11 which adjusts a hydraulic pressure from the mechanical oil pump 10m or the electrical oil pump 10e and supplies the adjusted hydraulic pressure to each component of the transmission 4, and a transmission controller 12 for controlling the hydraulic pressure control circuit 11 and the like.

The electrical oil pump 10e is driven by the electric motor which is driven by the supply of power from a battery 13, and supplies a hydraulic pressure to the hydraulic pressure control circuit 11. Note that the electric motor is controlled by a motor driver. The electrical oil pump 10e supplies the hydraulic pressure to the hydraulic pressure control circuit 11 when the hydraulic pressure cannot be supplied by the mechanical oil pump 10m, for example, when an idle stop control is executed in which the engine 1 is automatically stopped. A check valve 14 is provided in a flow path in which oil discharged from the electrical oil pump 10e flows. A comparison of the electrical oil pump 10e and the mechanical oil pump 10m shows that the electrical oil pump 10e is smaller in size than the mechanical oil pump 10m.

The transmission 4 includes a V-belt continuously variable transmission mechanism (hereinafter, referred to as a "variator 20") and a sub-transmission mechanism 30 provided in series with the variator 20. "To be provided in series" means that the variator 20 and the sub-transmission mechanism 30 are provided in series in a power transmission path from the engine 1 to the drive wheels 7. The sub-transmission mechanism 30 may be directly connected to an output shaft of the variator 20 as in this example or may be connected via another transmission mechanism or power transmission mechanism (e.g. gear train). Alternatively, the sub-transmission mechanism 30 may be connected to a stage (input shaft side) preceding the variator 20.

The variator 20 includes a primary pulley 21, a secondary pulley 22 and a V-belt 23 mounted between the pulleys 21 and 22. Each of the pulleys 21, 22 includes a fixed conical plate, a movable conical plate arranged such that a sheave surface faces toward the fixed conical plate and a V-groove is formed between the fixed conical plate and the movable conical plate, and a hydraulic cylinder 23a, 23b provided on the back surface of this movable conical plate for displacing the movable conical plate in an axial direction. When hydraulic pressures supplied to the hydraulic cylinders 23a, 23b are adjusted, the widths of the V-grooves change to change contact radii of the V-belt 23 and the respective pulleys 21, 22, whereby a speed ratio of the variator 20 continuously changes.

The sub-transmission mechanism 30 is a transmission mechanism with two forward speeds and one reverse speed. The sub-transmission mechanism 30 includes a Ravigneaux-type planetary gear mechanism 31 in which carriers of two planetary gears are coupled, and a plurality of frictional engagement elements (low brake 32, high clutch 33, rev brake 34) which are connected to a plurality of rotation elements constituting the Ravigneaux-type planetary gear mechanism 31 to change coupled states of these rotation elements. If hydraulic pressures supplied to each frictional engagement element 32 to 34 are adjusted to change engaged and released states of the respective frictional engagement elements 32 to 34, a gear position of the sub-transmission mechanism 30 is changed.

For example, the sub-transmission mechanism 30 is set to a first gear position if the low brake 32 is engaged and the high clutch 33 and the rev brake 34 are released. The transmission mechanism 30 is set to a second gear position having a smaller speed ratio than the first gear position if the high clutch 33 is engaged and the low brake 32 and the rev brake 34 are released. Further, the sub-transmission mechanism 30 is set to a reverse gear position if the rev brake 34 is engaged and the low brake 32 and the high clutch 33 are released.

When the vehicle is started, the sub-transmission mechanism 30 is set at the first gear position. Further, when a return is made from the idle stop control in which the engine 1 is stopped to improve fuel economy while the vehicle is stopped, the low brake 32 is completely engaged by having the hydraulic pressure supplied thereto and the high clutch 33 is set in a slip interlock state. The slip interlock state means a state where the high clutch 33 is not completely engaged and a predetermined slip state is set. Here, a state where the piston stroke of the high clutch 33 is completed and the high clutch 33 has been moved to a position where it is not completely engaged is referred to as the slip interlock state. Further, "to set the high clutch 33 in the slip interlock state" is referred to as to slip-interlock.

When the high clutch 33 is set in the slip interlock state, a part of drive power generated by the engine 1 is transmitted to the drive wheels 7. Note that when the low brake 32 is completely engaged and the hydraulic pressure supplied to the high clutch 33 is further increased from the hydraulic pressure in the slip interlock state, the high clutch 33 is completely engaged and the interlock state is set. When the interlock state is set, the drive power generated by the engine 1 is not transmitted to the drive wheels 7.

By slip-interlocking the high clutch 33 when a return is made from the idle stop control, it is possible to reduce a feeling as if the vehicle were pushed, which feeling is caused by an increase in an engine rotation speed Ne, and reduce a sense of incongruity given to a driver.

Figure 2:
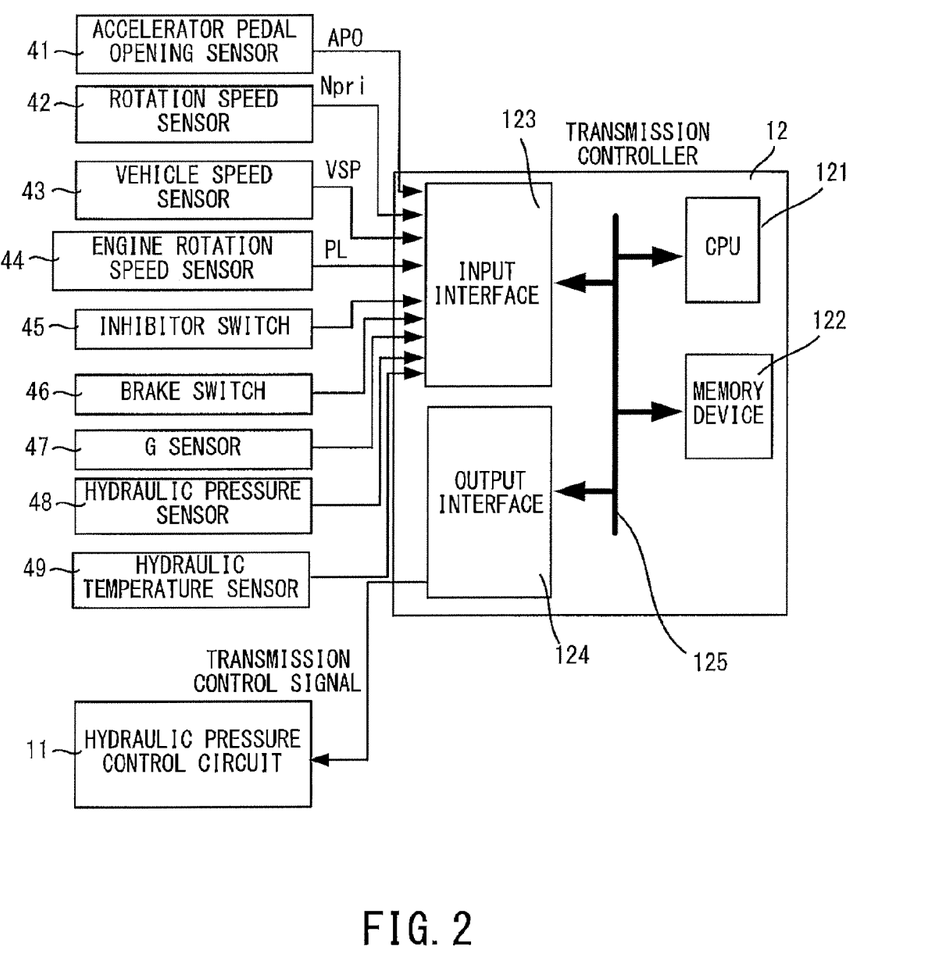
FIG. 2 is a schematic configuration diagram of a transmission controller in the embodiment of the present invention.

The transmission controller 12 includes a CPU 121, a memory device 122 composed of a RAM/ROM, an input interface 123, an output interface 124 and a bus 125 which connects these components to each other as shown in FIG. 2.

To the input interface 123 are input an output signal of an accelerator pedal opening sensor 41 for detecting an accelerator pedal opening APO which is an operation amount of an accelerator pedal, an output signal of a rotation speed sensor 42 for detecting an input rotation speed of the transmission 4, an output signal of a vehicle speed sensor 43 for detecting a vehicle speed VSP, an output signal of an engine rotation speed sensor 44 for detecting an engine rotation speed, an output signal of an inhibitor switch 45 for detecting the position of a select lever, an output signal of a brake sensor 46 for detecting the depression of a foot brake, a signal from a G sensor 47 for detecting the gradient of the vehicle, an output signal from a hydraulic pressure sensor 48 for detecting a hydraulic pressure supplied to the high clutch 33, a signal of an oil temperature sensor 49 for detecting oil temperature of oil in an oil pan 50, and the like.

A control program (FIG. 3) for determining whether or not it is possible to execute the idle stop control, and the like are stored in the memory device 122. The CPU 121 reads the control program stored in the memory device 122 and implements it to generate a control signal by performing various arithmetic processing on various signals input via the input interface 123, and outputs the generated control signal to the hydraulic pressure control circuit 11, the electrical oil pump 10e and the like via the output interface 124. Various values used in the arithmetic processing by the CPU 121 and calculation results thereof are appropriately stored in the memory device 122.

The hydraulic pressure control circuit 11 is composed of a plurality of flow paths and a plurality of hydraulic control valves. The hydraulic pressure control circuit 11 switches a hydraulic pressure supply path, prepares a necessary hydraulic pressure from a hydraulic pressure produced in the mechanical oil pump 10m or the electrical oil pump 10e and supplies this to each component of the transmission 4 by controlling the plurality of hydraulic control valves based on a transmission control signal from the transmission controller 12. In this way, the speed ratio of the variator 20 and the gear position of the sub-transmission mechanism 30 are changed, whereby the transmission 4 is shifted.

When the vehicle is stopped, the idle stop control is executed in which the engine 1 is stopped to improve fuel economy. Since the engine 1 is stopped and no hydraulic pressure can be supplied from the mechanical oil pump 10m during the idle stop control, the electrical oil pump 10e is driven to supply a hydraulic pressure from the electrical oil pump 10e.

If a gradient of a road surface on which the vehicle is stopped is large, the inclination of the oil in the oil pan 50 is large, whereby a suction port of an oil strainer 51 may come out of the oil and air may be sucked together with the oil. If air is introduced into the electrical oil pump 10e, a discharge pressure of the electrical oil pump 10e decreases and the electrical oil pump 10e cannot supply a sufficient hydraulic pressure.

Further, if oil temperature is low, a sealing function of seal portions decreases and the amount of oil leakage increases. Furthermore, if oil temperature is high, the viscosity of oil decreases and the amount of oil leakage from the seal portions increases. The seal portions are, for example, gaskets, packings or the like used in the frictional engagement elements. Thus, the electrical oil pump 10e cannot supply a sufficient hydraulic pressure to the frictional engagement elements.

Thus, even if the gradient of the road surface on which the vehicle is stopped is small, the amount of oil leakage increases and a sufficient hydraulic pressure cannot be supplied by the electrical oil pump 10e when oil temperature is low or high. If the idle stop control is executed in such a case, the hydraulic pressure supplied to the low brake 32 and the like decreases. Thus, when a return is made from the idle stop control, it takes a longer time until the low brake 32 is engaged and the vehicle may slide down backward.

Particularly in the case of slip-interlocking the high clutch 33, the hydraulic pressure has to be supplied also to the high clutch 33. Thus, it takes an even longer time until the low brake 32 is engaged. Further, when the hydraulic pressure of the high clutch 33 increases and the high clutch 33 is set in a predetermined slip interlock state, a braking force is applied to the vehicle by the sub-transmission mechanism 30. If the amount of oil leakage increases, it takes a longer time until the high clutch 33 is set in the predetermined slip interlock state. Thus, the vehicle may slide down backward.

Accordingly, in this embodiment, whether or not it is possible to execute the idle stop control is determined using a gradient threshold value set based on oil temperature.

Figure 3:
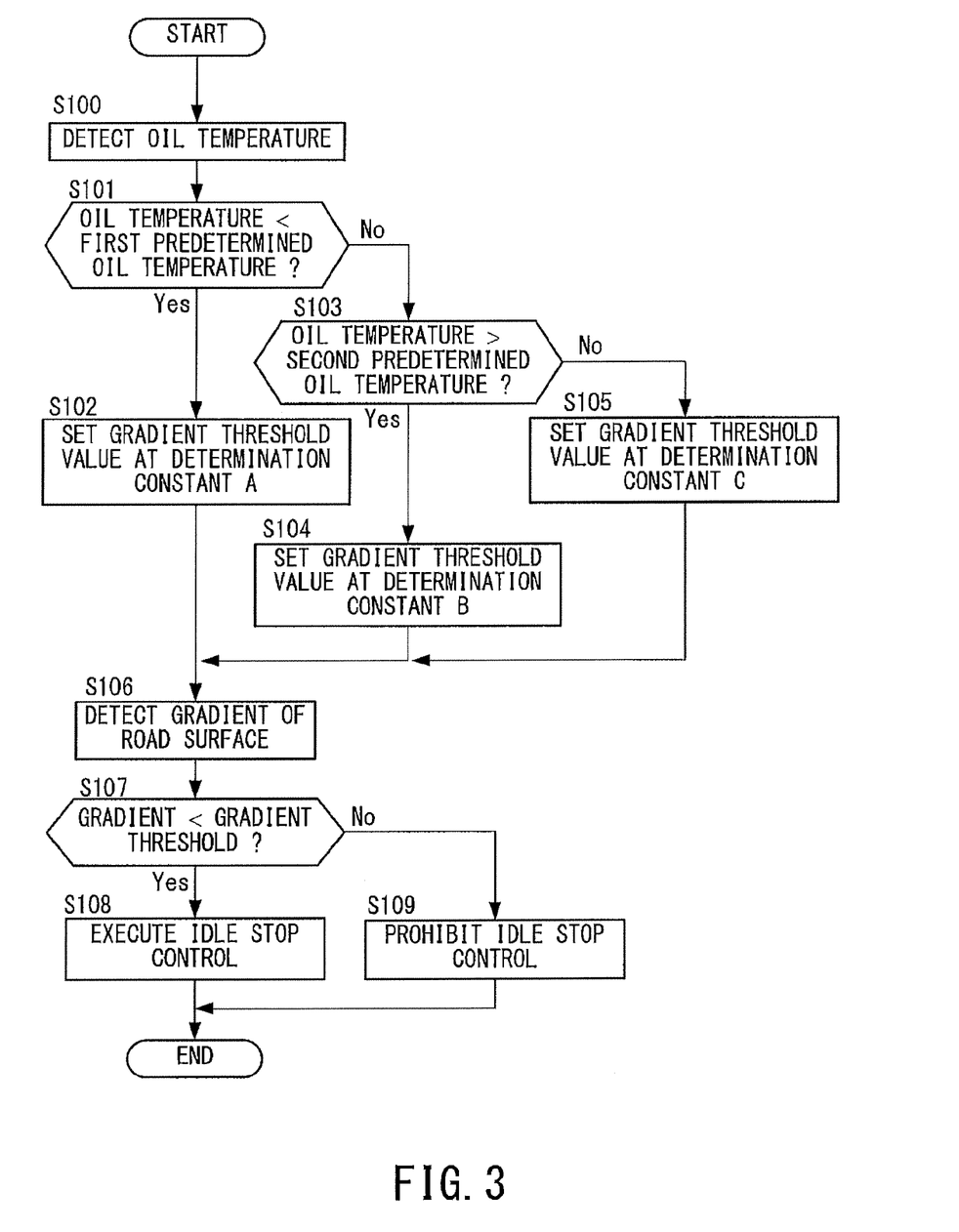
FIG. 3 is a flow chart showing a control of determining whether or not it is possible to execute an idle stop control in the embodiment of the present invention.

Next, an execution determination control for the idle stop control in this embodiment is described using a flow chart of FIG. 3. Note that it is assumed here that an idle stop is started by an idle stop start determination.

In the idle stop start determination, it is determined to start the idle stop in the case of satisfying conditions such as (1) the accelerator pedal is not depressed, (2) a brake pedal is depressed, (3) the select lever is in D-range or N-range and (4) the vehicle speed is equal to or lower than a predetermined vehicle speed. On the other hand, it is determined not to start the idle stop, for example, when any of the above conditions is not satisfied.

In Step S100, oil temperature is detected by the oil temperature sensor 49.

In Step S101, the detected oil temperature is compared with a first predetermined oil temperature. Step S102 follows if the oil temperature is lower than the first predetermined oil temperature, whereas Step S103 follows if the oil temperature is equal to or higher than the first predetermined oil temperature. The first predetermined oil temperature is set to be lower than normal oil temperature.

Here, the normal oil temperature is oil temperature in a state where the vehicle is steadily operated under a normal operating environment. Specifically, the normal oil temperature is oil temperature in a temperature range higher than a low oil temperature range in a state where the transmission 4 is warmed up and oil temperature in a temperature range lower than a high temperature range in a state where the amount of heat generation of the transmission 4 is large (e.g. state where the amount of heat generation is large due to the slip of the frictional engagement elements of the sub-transmission mechanism 30). Generally, the normal oil temperature indicates oil temperature of about 80° C. to 95° C.

As the oil temperature decreases from this normal oil temperature, shrinkage of the seal portions increases (diameters of seal rings are more reduced) and the amount of oil leakage increases.

If the amount of oil leakage increases and exceeds a predetermined amount, the hydraulic pressure supplied to the frictional engagement elements falls below a hydraulic pressure necessary to set the frictional engagement elements in a power transmission state and the frictional engagement elements cannot maintain the power transmission state.

Thus, the first predetermined oil temperature may be set at an oil temperature at which the amount of oil leakage exceeds the predetermined amount in the low oil temperature range and is set, for example, at 60° C. in this embodiment.

In Step S102, the gradient threshold value is set at a determination constant A. The determination constant A is a value set in advance. The determination constant A indicates a gradient at which the vehicle does not slip down backward in the case where the vehicle is stopped on a road surface having a gradient of "A", the idle stop control is executed and a return is then made from the idle stop control when the oil temperature is the first predetermined oil temperature. That is, the determination constant A indicates an upper limit gradient at which the hydraulic pressure can be sufficiently supplied by the electrical oil pump 10e and the vehicle does not slide down backward at startup even if the idle stop control is executed when the oil temperature is the first predetermined oil temperature. The determination constant A is a value set through an experiment or the like.

In Step S103, the detected oil temperature is compared with a second predetermined oil temperature. Step S104 follows if the oil temperature is higher than the second predetermined oil temperature, whereas Step S105 follows if the oil temperature is equal to or lower than the second predetermined oil temperature. That is, Step S105 follows if the oil temperature is equal to or higher than the first predetermined oil temperature and equal to or lower than the second predetermined oil temperature. The second predetermined oil temperature is set at oil temperature higher than the normal oil temperature.

As the oil temperature increases from the normal oil temperature, oil viscosity decreases and oil tends to leak from the control valves and a slide portion of the electrical oil pump, whereby the amount of oil leakage increases.

If the amount of oil leakage increases and exceeds the predetermined amount, the hydraulic pressure supplied to the frictional engagement elements falls below the hydraulic pressure necessary to set the frictional engagement elements in the power transmission state and the frictional engagement elements cannot maintain the power transmission state.

Thus, the second predetermined oil temperature may be set at oil temperature at which the amount of oil leakage exceeds the predetermined amount in the high oil temperature range and is set, for example, at 115° C. in this embodiment.

In Step S104, the gradient threshold value is set at a determination constant B. The determination constant B is a value set in advance. The determination constant B indicates a gradient at which the vehicle does not slip down backward in the case where the vehicle is stopped on a road surface having a gradient of "B", the idle stop control is executed and a return is then made from the idle stop control when the oil temperature is the second predetermined oil temperature. The determination constant B is a value set through an experiment or the like. That is, the determination constant B indicates an upper limit gradient at which the hydraulic pressure can be sufficiently supplied by the electrical oil pump 10e and the vehicle does not slide down backward at startup even if the idle stop control is executed when the oil temperature is the second predetermined oil temperature. The determination constant B is a value set through an experiment or the like.

In Step S105, the gradient threshold value is set at a determination constant C. The determination constant C is a value set in advance. The determination constant C indicates a gradient at which the vehicle does not slip down backward when the oil temperature is equal to or higher than the first predetermined oil temperature and equal to or lower than the second predetermined oil temperature, the vehicle is stopped on a road surface having a gradient of "C", the idle stop control is executed and a return is then made from the idle stop control. That is, the determination constant C indicates an upper limit gradient at which the hydraulic pressure can be sufficiently supplied by the electrical oil pump 10e and the vehicle does not slide down backward at startup even if the idle stop control is executed when the oil temperature is equal to or higher than the first predetermined oil temperature and equal to or lower than the second predetermined oil temperature. The determination constant C is a value set through an experiment or the like.

The determination constants A and B are values smaller than the determination constant C. That is, the gradient threshold value when the oil temperature is lower than the first predetermined oil temperature or higher than the second predetermined oil temperature is smaller than that when the oil temperature is equal to or higher than the first predetermined oil temperature and equal to or lower than the second predetermined oil temperature.

In Step S106, the gradient of the road surface on which the vehicle is stopped is detected by the G sensor 47.

In Step S107, the detected gradient of the road surface and the gradient threshold value set by the above control are compared. Step S108 follows if the detected gradient of the road surface is smaller than the set gradient threshold value, whereas Step S109 follows if the detected gradient of the road surface is equal to or larger than the set gradient threshold value.

In Step S108, the idle stop control is executed since the hydraulic pressure can be sufficiently supplied by the electrical oil pump 10e when a return is made from the idle stop control even if the idle stop control is executed on the road surface on which the vehicle is stopped.

In Step S109, the idle stop control is prohibited since the hydraulic pressure cannot be sufficiently supplied by the electrical oil pump 10e when a return is made from the idle stop control if the idle stop control is executed on the road surface on which the vehicle is stopped.

The gradient threshold value is smaller when the oil temperature is lower than the first predetermined oil temperature or higher than the second predetermined oil temperature. Even if the gradient of the road surface is same, the amount of oil leakage increases when the oil temperature is low or high, wherefore the hydraulic pressure that can be supplied from the electrical oil pump 10e decreases.

In this embodiment, by decreasing the gradient threshold value when the oil temperature is lower than the first predetermined oil temperature or higher than the second predetermined oil temperature, the idle stop control is prohibited when the hydraulic pressure supplied from the electrical oil pump 10e is low. This can suppress a backward and downward slide of the vehicle when the vehicle is started again after being stopped on an uphill road surface in a traveling direction.

Figure 4:
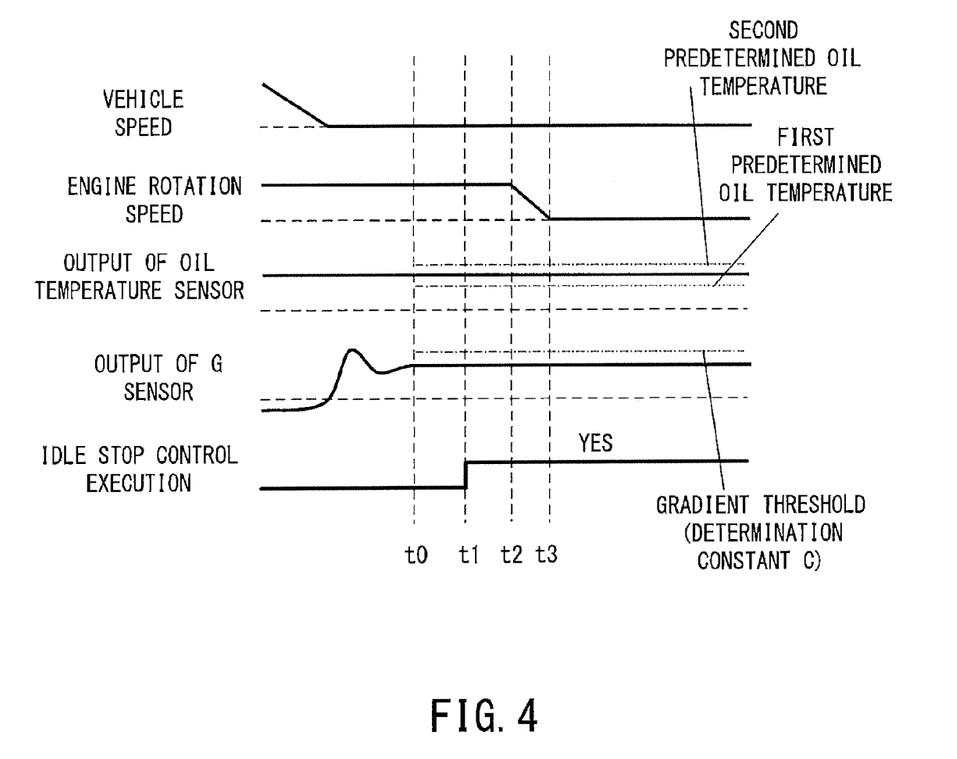
FIG. 4 is a time chart showing whether or not it is possible to execute the idle stop control in the embodiment of the present invention.
Figure 5:
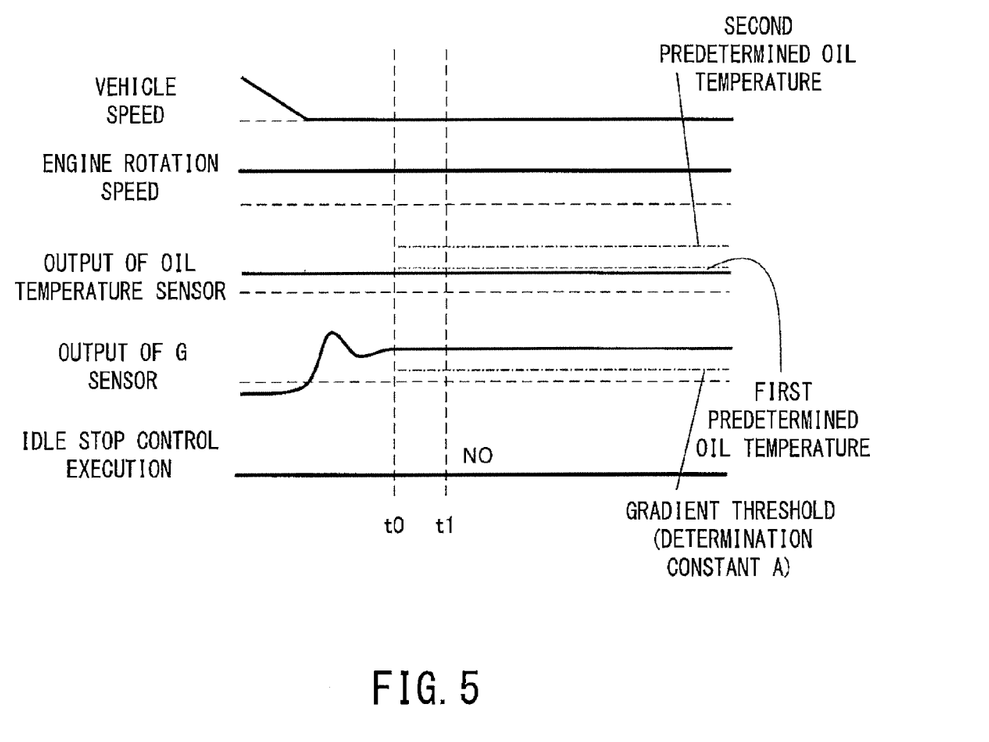
FIG. 5 is a time chart showing whether or not it is possible to execute the idle stop control in the embodiment of the present invention.
Figure 6:
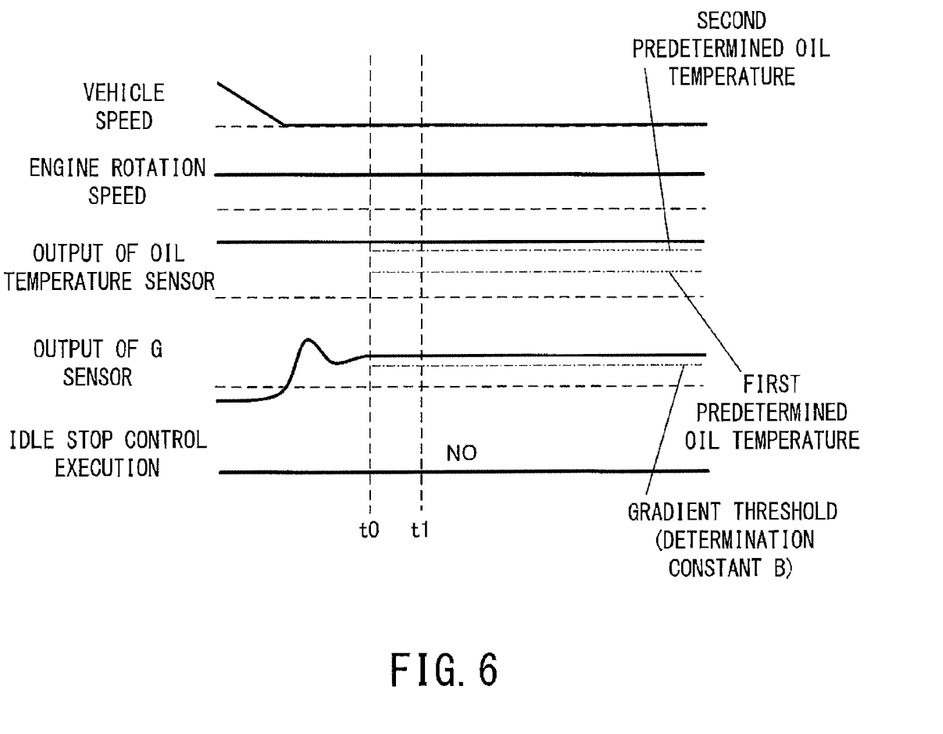
FIG. 6 is a time chart showing whether or not it is possible to execute the idle stop control in the embodiment of the present invention.

Next, whether or not it is possible to execute the idle stop control in this embodiment is described using time charts of FIGS. 4 to 6.

FIG. 4 is a time chart when the oil temperature is equal to or higher than the first predetermined oil temperature and equal to or lower than the second predetermined oil temperature. In FIG. 4, the gradient threshold value is set at the determination constant C.

After it is determined to start the idle stop control, the gradient of the road surface on which the vehicle is stopped is detected at time t0 and the detected gradient and the gradient threshold value, which is the determination constant C, are compared at time t1. Here, since the detected gradient is smaller than the gradient threshold value, the idle stop control is executed. This causes the engine rotation speed to decrease at time t2 and become zero at time t3.

FIG. 5 is a time chart when the oil temperature is lower than the first predetermined oil temperature. In FIG. 5, the gradient threshold value is set at the determination constant A.

After it is determined to start the idle stop control, the gradient of the road surface on which the vehicle is stopped is detected at time t0 and the detected gradient and the gradient threshold value, which is the determination constant A, are compared at time t1. Here, since the detected gradient is larger than the gradient threshold value, the idle stop control is prohibited. Thus, the engine rotation speed is kept, for example, at an idle rotation speed. This can suppress a backward and downward slide of the vehicle when the vehicle is started again after being stopped on an uphill road surface in the traveling direction.

FIG. 6 is a time chart when the oil temperature is higher than the second predetermined oil temperature. In FIG. 6, the gradient threshold value is set at the determination constant B.

After it is determined to start the idle stop control, the gradient of the road surface on which the vehicle is stopped is detected at time t0 and the detected gradient and the gradient threshold value, which is the determination constant B, are compared at time t1. Here, since the detected gradient is larger than the gradient threshold value, the idle stop control is prohibited. Thus, the engine rotation speed is kept, for example, at the idle rotation speed. This can suppress a backward and downward slide of the vehicle when the vehicle is started again after being stopped on an uphill road surface in the traveling direction.

Note that the gradient threshold value may be calculated using a map indicating a relationship between the oil temperature and the gradient threshold value or the like. For example, the amount of oil leakage from the electrical oil pump 10e based on the oil temperature can be obtained by an experiment or the like. Thus, by calculating an upper limit gradient with respect to the oil temperature and setting the upper limit gradient as the gradient threshold value, whether or not it is possible to execute the idle stop control can be determined based on the oil temperature and the gradient when the vehicle is stopped. In this case, the gradient threshold value may be constant in a certain temperature range (e.g. from the first predetermined oil temperature to the second predetermined oil temperature) and decreased when the oil temperature decreases from the certain temperature range and when the oil temperature increases from the certain temperature range.

Effects of the present invention are described.

At low temperature, clearances are formed, for example, due to the reduced diameters of the seal rings of the frictional engagement elements, whereby the sealing function of the seal portions decreases, the amount of oil leakage increases, the hydraulic pressure supplied from the electrical oil pump 10e decreases and the frictional engagement elements cannot maintain the power transmission state. In this embodiment, when the oil temperature is lower than the normal oil temperature and the amount of oil leakage is large, the gradient threshold value is made smaller than that at the normal oil temperature, thereby tightening permission conditions for the execution of the idle stop control. This can suppress a backward and downward slide of the vehicle when the vehicle is started again after being stopped on an uphill road surface in the traveling direction.

Further, at high temperature, the viscosity of oil decreases, the amount of oil leakage from the seal portions increases, the hydraulic pressure supplied from the electrical oil pump 10e decreases and the frictional engagement elements cannot maintain the power transmission state. In this embodiment, when the oil temperature is higher than the normal oil temperature and the amount of oil leakage is large, the gradient threshold value is made smaller than that at the normal oil temperature, thereby tightening the permission conditions for the execution of the idle stop control. This can suppress a backward and downward slide of the vehicle when the vehicle is started again after being stopped on an uphill road surface in the traveling direction.

The present invention is not limited to the embodiments described above and obviously includes various modifications and improvements which can be made within the scope of the technical concept thereof.

This application claims priority from Japanese Patent Application No. 2010-52376, filed Mar. 9, 2010, which is incorporated herein by reference in its entirety.

The invention claimed is:

1. An automatic transmission to be combined with an engine which performs an idle stop, comprising:
    an electrical oil pump which is driven while the engine is automatically stopped;
    an oil temperature detection unit which detects oil temperature of oil supplied to the electrical oil pump;
    a gradient threshold value setting unit which sets a gradient threshold value based on the oil temperature;
    a gradient detection unit which detects a gradient of a road surface on which a vehicle is stopped; and
    an idle stop prohibition unit which prohibits the idle stop when the gradient is larger than the gradient threshold value;
    wherein the gradient threshold value setting unit sets a gradient threshold value smaller than that at normal oil temperature when the oil temperature is lower or higher than the normal oil temperature.

2. A control method for an automatic transmission to be combined with an engine which performs an idle stop, comprising the steps of:
    detecting oil temperature of oil supplied to an electrical oil pump;
    setting a gradient threshold value smaller than that at normal oil temperature when the oil temperature is lower or higher than the normal oil temperature;
    detecting a gradient of a road surface on which a vehicle is stopped; and
    prohibiting the idle stop when the gradient is larger than the set gradient threshold value.

\* \* \* \* \*